April 22, 1969

T. W. JACKSON 3,439,412

METHOD OF INSTALLING A FASTENER

Filed March 21, 1966

INVENTOR
Thomas W. Jackson

BY: Lawton, Hopkins,
Jones & Ormsby

ATTORNEYS

United States Patent Office 3,439,412
Patented Apr. 22, 1969

3,439,412
METHOD OF INSTALLING A FASTENER
Thomas W. Jackson, Atlanta, Ga., assignor to Georgia Tech Research Institute of Technology, Atlanta, Ga., a corporation of Georgia
Filed Mar. 21, 1966, Ser. No. 535,841
Int. Cl. B21d *39/00;* B23p *11/00;* F16b *13/04*
U.S. Cl. 29—509           3 Claims

ABSTRACT OF THE DISCLOSURE

A method for installing fasteners having a head and a shank with a passage extending through the head and into the shank of the fastener. The passage terminates in the shank at a distance substantially equal to the thickness of the workpiece in which the fastener is installed. The fastener is inserted through the workpiece and a tool is inserted through the head and into the passage. The fastener is prevented from rotating while the tool is rotated and urged against the end of the passage. This causes the end of the shank extending beyond the workpiece to become plastic because of frictional heat whereupon the tool is forced through the shank and head to expand the extending end of the shank and lock the fastener in the workpiece.

---

This invention relates generally to a method of installing fasteners and, more particularly, to a method of installing a fastener which is fixedly positionable within a hole through a workpiece from one side only of the workpiece and which will serve either as a fastener to fasten a plurality of members in a workpiece together or as a bushing through a workpiece.

Several varieties of fasteners which may be positioned from one side only of a workpiece are known in the prior art. These fasteners are generally referred to as blind fasteners and are usually in the form of a shank and a head having a continuous passage through both the shank and head to receive an expanding pin. The expanding pin is moved within the passage to cause the shank to expand and lock the fastener in position within a hole through a workpiece. However, an explosive charge is also frequently used to expand the shank by detonating the explosive charge in a passage or other cavity in the shank.

One of the problems with these prior art fasteners is that the number of different elements or pieces required for each fastener makes each fastener relatively expensive to manufacture. In addition, these prior art fasteners have frequently required special and relatively expensive tools for their use.

Moreover, these prior art fasteners have often failed to firmly hold a plurality of members in a workpiece in position relative to each other. Further, in those fasteners using an expanding pin, the pin is usually broken off within the shank as the shank is expanded so as to result in these fasteners being relatively heavy for use in aircraft or other structures requiring a minimizing of weight. Similarly, in those prior art fasteners using an explosive charge to expand the shank, the shock waves which result from the explosion of each charge frequently damage or weaken a structure with which these fasteners are used.

The invention disclosed herein eliminates these and other problems associated with prior art fasteners in that it is a light-weight, single-element fastener which is easily and quickly fixed in position within a hole through a workpiece using a simple, relatively inexpensive and readily available tool. Moreover, once fixed in position within a hole through a workpiece, the invention firmly holds the workpieces in position with respect to each other. Thus, the invention avoids the plurality of elements, the special tools, the weight, and other problems associated with prior art fasteners.

These improvements in a fastener are provided by a fastener comprising a head, a shank, and a passage extending through the head and along only a portion of the length of the shank. The length of the passage is predetermined so that when the shank is inserted through a hole in a workpiece and the head is flush against that side of the workpiece which is accessible, the passage terminates within the shank substantially at the blind side of the workpiece. The extending end of the shank beyond the passage is sufficiently small or is otherwise arranged to be rendered plastic by the heat at the end of the passage within the shank.

This heat at the end of the passage within the shank is easily and conveniently provided by inserting a shaft within the passage and rotating the end of the shaft against the end of the passage so as to generate heat of friction.

As the extending end of the shank beyond the passage is being rendered plastic by this heat, the shaft or other means for providing heat is urged against that end of the passage within the shank and as a result, the extending end of the shank beyond the passage and adjacent the blind side of the workpiece yields and allows the passage of the shaft along the length of the shank. This, in turn, results in the substantially uniform outward expanding of the extending end of the shank adjacent the blind side of the workpiece and when the extending end of the shank cools, the members of a workpiece are firmly held between the head and the expanded extending end of the shank.

The motion of the shaft or other means for providing heat readily expands the extending end of the shank because of the plastic state of the extending end and the shaft or means for providing heat may be simply a shaft rotated by a conventional hand drill. It is for this reason that the fastener disclosed herein is quickly and easily fixed in a hole through a workpiece by a simple, relatively inexpensive tool.

Moreover, the plastic state of the extending end of shank when it is expanded prevents the extending end from fracturing or splitting as it expands and provides a substantially continuous and rigid expanded extending end which has great strength. In addition, as the extending end of the shank cools, it contracts against the blind side of the workpiece to further shorten the space between the head and the expanded extending end and increase the firmness with which the members of a workpiece are held together.

The passage which extends completely through the fastener after the shaft or other means for providing heat has been removed serves to provide a fastener which is light in weight and well adapted to aircraft and similar uses. This passage which extends completely through the fastener after it is in position also serves with the simplicity of the fastener to provide a fastener which is well adapted for use as a bushing. When used as a bushing, the fastener disclosed herein provides an inexpensive bushing which is easily installed in difficult work sites.

These and other features and advantages of the present invention will be more clearly understood upon consideration of the following specification and the accompanying drawings in which like characters of reference designate corresponding parts throughout and wherein.

Figure 1:
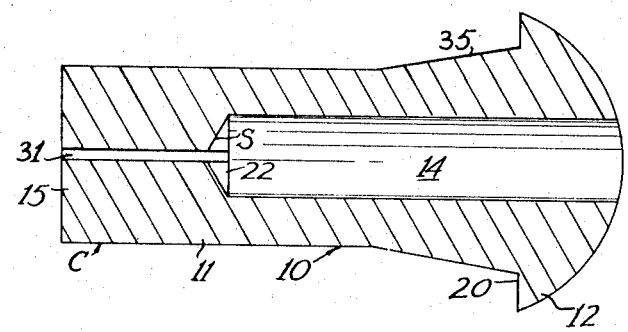
FIG. 1 is a cross-sectional view of an embodiment of the invention.

These figures and the following detailed description disclose several specific embodiments of the invention. However, the invention is not limited to these embodiments since the inventive concept may be embodied in other equivalent forms.

The fastener 10 disclosed herein is best understood as comprising a shank 11 and a head 12 having a passage 14 extending into and through the head 12 and along the centerline of the shank 11 for a portion of the length of the shank 11. The passage 14 terminates within the shank 11 at a substantially transverse terminal surface S and the terminal surface S is positioned within the shank 11 at approximately that point which will be in the plane of the blind side B of a workpiece P when the shank 11 is inserted through a hole 23 in the workpiece P until the head 12 engages the accessible side A of the workpiece P. Thus, it will be understood that the length of the passage 14 is predetermined by the thickness of the workpiece P with which the fastener 10 is to be used.

However, regardless of the length of the passage 14, the shank 11 includes an extending end 15 through which the passage 14 does not extend and which extends outwardly from the blind side B of a workpiece P when the head 12 engages the accessible side A of the workpiece P. It is with respect to this extending end 15 that the embodiments of the invention disclosed herein differ. In the embodiment of the invention shown in FIG. 1, the extending end 15 is a solid cylinder C having a channel 31 extending through it from the terminal surface S.

Figure 2:
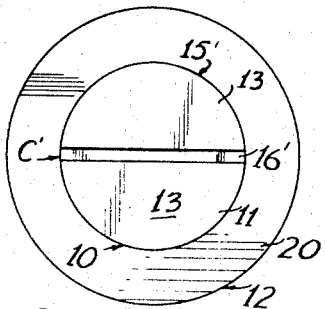
FIG. 2 is an end view of the extending end of the shank of a second embodiment of the invention.
Figure 3:
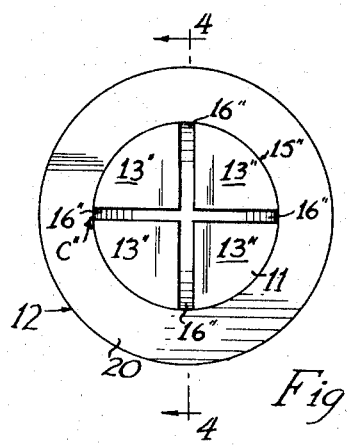
FIG. 3 is an end view of the extending end of the shank of a third embodiment of the invention.
Figure 5:
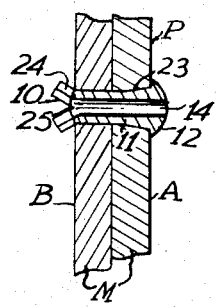
FIG. 5 is a cross-sectional view of that embodiment of the invention shown in FIG. 4 after it has been set in the hole through the workpiece and the shaft removed.
Figure 6:
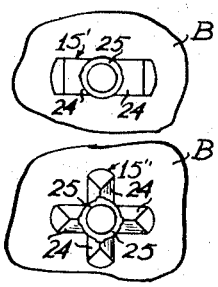
FIG. 6 is an end view of that embodiment of the invention shown in FIG. 2 after the extending end of the shank has been expanded.

However, in that embodiment of the invention shown in FIGS. 2 and 6, the extending end 15' includes a cylinder C' and a pair of opposed retaining tabs 13 formed by a transverse slot 16 in the extending end 15'. Similarly, in that embodiment of the invention shown in FIGS. 3–5 and 7, the extending end 15" includes a cylinder C" and four retaining tabs 13" formed by two slots 16" in the extending end 15". It will be noted that in those embodiments of the invention shown in FIGS. 2–7, the channel 31 is omitted. The channel 31 may also be omitted from that embodiment of the invention shown in FIG. 1.

It will now be understood that regardless of the embodiment of invention, there is a head 12, a shank 11, and a passage 14 which would extend the length of the shank 11 if it were not for a cylinder C. It is the cylinder C which in cooperation with the passage 14 provides a fastener 10 which is easily and conveniently fixed in position in a hole 23 through a workpiece P.

This is because it is the cylinder C which is rendered plastic by heat at the terminal surface S of the passage 14 and which in response to force exerted on the terminal surface S by a shaft 21 or other means for providing this heat expands to allow the shaft 21 to move completely through the extending end 15. The expanding of the cylinder C as the shaft 21 moves through the extending end 15 forms a substantially continuous ring 25 having a diameter greater than the diameter of the shank 11.

Figure 4:
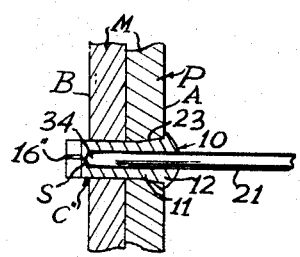
FIG. 4 is a cross-sectional view of that embodiment of the invention shown in FIG. 3 taken in line 4—4 in FIG. 3 and shows the embodiment of the invention inserted in a hole through a workpiece and with a rotating shaft initially engaging the inner end of the passage.

Thus, when the fastener 10 disclosed herein is inserted through a hole 23 in a workpiece P as shown in FIG. 4 so that the head 12 is against the accessible side A of the workpiece P and the extending end 15 of the shank 11 extends beyond the blind side B of the workpiece P, the expanding of the cylinder C to form the ring 25 in response to heat and the motion of a means for providing heat such as a rotating shaft 21 serves to prevent the removal of the fastener 10 from the workpiece P. It now will be understood that the placing of the terminal surface S of the passage 14 along the length of the shank 11 at that point which substantially corresponds to the plane of the blind side B of the workpiece P serves to cause the ring 25 to be formed from the cylinder C against the blind side B of the workpiece P and in that position at which it effectively serves with the head 12 to hold a plurality of members M of a workpiece P firmly against each other.

Figure 7:
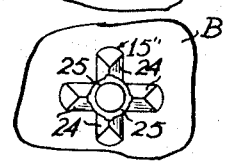
FIG. 7 is an end view of that embodiment of the invention shown in FIG. 3 after the extending end of the shank has been expanded.

Moreover, as the ring 25 cools after being formed from the cylinder C, the ring 25 contracts toward the head 12 so as to further shorten the distance between the ring 25 and the head 12 and more firmly hold the plurality of members M of a workpiece P against each other. The retaining tabs 13 in those embodiments of the invention shown in FIGS. 2 through 7 spread outwardly as the ring 25 is formed and with the passage of the rotating shaft 21 or other means for providing heat along the length of the shank 11. Thus, the retaining tabs 13 provide embodiments of the invention which are fixed in position in a workpiece P not only by the ring 25 but also by the spread retaining tabs 13 as shown in FIGS. 5, 6, and 7.

It will be understood that in an embodiment of the invention including retaining tabs 13, the retaining tabs 13 are maintained in spread position by the ring 25 formed by the expanding of the cylinder C and provide an embodiment of the invention which offers great resistance to the removal of the fastener 10 from a workpiece P or to the motion of a plurality of members M in a workpiece P relative to each other. However, it will also be understood that an embodiment of the invention which does not include retaining tabs 13 is as an effective fastener as most prior art fasteners and that whether retaining tabs 13 are included or not, the fastener 10 disclosed herein provides a single-element fastener which is relatively light and inexpensive to manufacture and which is easily and conveniently fixed in position.

For example, it has been found that a fastener 10 is easily and conveniently fixed in position in a workpiece P using a shaft 21 of tool steel or similar material rotated by a conventional hand drill (not shown). The end 34 of the shaft 21 generally conforms in shape to that of the terminal surface S and when the shaft 21 is rotated and inserted in the passage 14 and the end 34 of the shaft 21 urged against the terminal surface S with moderate manual pressure, heat of friction is generated within the shank 11 at the terminal surface S by the rotation of the shaft 21 relative to the fastener 10.

In order to insure that the fastener 10 does not rotate with the shaft 21 within a hole 23 through a workpiece P, the shank 11 has a diameter slightly greater than that of the hole 23 at 35 adiacent the head 12 which serves to wedge the fastener 10 in a hole 23 as a shaft 21 is urged against the terminal surface S. It will be understood that remote from the head 12 and along most of the length of the shank 11, the shank 11 has a diameter which is slightly less than that of a hole 23 and which permits its easy insertion into the hole 23.

It will also be understood that the heat of friction generated at the terminal surface S by the shaft 21 renders that portion of the extending end 15 adjacent the terminal surface S plastic and that when this occurs, the force with which the shaft 21 is being urged against the terminal surface S causes the shaft 21 to move along the length of the extending end 15. As the end 34 of the shaft 21 moves, it generates heat of friction along the length of the extending end 15 and expands the cylinder C into the ring 25.

The channel 31 through the extending end 15 of that embodiment of the invention shown in FIG. 1 facilitates the motion of shaft 21 through the extending end 15 when the extending end 15 is rendered plastic. However, it will be understood that the shaft 21 will move along the length of the extending end 15 in the absence of the channel 31.

Moreover, regardless of the absence or presence of the channel 31 through the extending end 15, the cylinder C defined by the extending end 15 must be of that length which will result in it being rendered plastic by heat at the terminal surface S and which will expand under moderate pressure into the ring 25 without significant fracturing or breaking at least in that portion of its length adjacent the terminal surface S. Since this desired length of the cylinder C will vary with the material used to form the fastener 10 and since it has been found not to be critical, those skilled in the art will empirically select that length and arrangement of the cylinder C which is most appropriate for the material used to form the fastener 10 and for other particular conditions such as the particular means for providing heat which it is desired to use. Regardless of the length of cylinder C, the fastener 10 is easily and conveniently fixed in position in the manner described above.

This ease and convenience with which the fastener 10 is fixed in position in a hole 23 and the passage 14 completely through the fastener 10 after removal of a shaft 21 make the fastener 10 not only ideally suited to serve as a fastener for positioning a plurality of members M of a workpiece P relative to each other but also to serve as a bushing through a workpiece P. When used as a bushing, the fastener 10 must not only resist rotation by a shaft 21 but also by the rotating axle or other rotating member (not shown) with which it is used and although the increased diameter of the shank 11 at 35 adjacent the head 12 prevents the rotation of the fastener 10 within a hole 23 through a workpiece P by a shaft 21, it has been found that when the fastener 10 is used as a bushing for an axle or other rotating member (not shown), the fixed positioning of the fastener 10 within a workpiece P is insured by using a shaft 21 having a diameter slightly greater than the diameter of the passage 14 to fix the fastener 10 within a hole 23. This is because the passage of a shaft 21 having a diameter slightly greater than the diameter of the passage 14 forces the shank 11 of the fastener 10 outwardly within the hole 23 to securely fix the fastener 10 within the hole 23 so that the fastener 10 will resist any tendency to rotate with an axle or other rotating member (not shown).

From the foregoing, it will be seen that the fastener 10 disclosed herein provides a simple, single-piece fastener 10 which is easily and conveniently fixed in position using simply a rotating shaft 21 and which once fixed in position, will serve to position a plurality of members M of a workpiece P relative to each other or to provide a bushing for a rotating axle (not shown). Other uses of the fastener 10 will be readily apparent to those skilled in the art. However, regardless of the manner in which the fastener 10 disclosed herein is used, it is relatively light in weight and ideally suited to aircraft and similar applications.

It will be obvious to those skilled in the art that many variations may be made in the embodiments chosen for the purpose of illustrating the present invention without departing from the scope thereof as defined by the appended claims.

What is claimed as invention is:

1. A method of positioning a plurality of members of a workpiece relative to each other with a fastener having a head and a shank with a passage extending through said head and into said shank for a distance within said shank which is substantially equal to the thickness of said workpiece comprising the steps of:
   inserting said shank through a hole in said workpiece until said head engages a side of said workpiece,
   passing a shaft into said passage through said head,
   rotating the end of said shaft against the end of said passage within said shank until said shank adjacent said end of said passage is rendered plastic by the resulting heat of friction, and
   urging said shaft along said shank away from said head as said shank becomes plastic until said shaft extends through said head and said shank to radially expand the metal defining the end of said shank extending beyond said hole in said workpiece to secure said fastener thereto.

2. The method of claim 1 wherein the step of rotating the shaft and the step of urging the shaft along the shank to expand the end of the shank are performed simultaneously.

3. The method of claim 1 further including the step of preventing the fastener from rotating in the workpiece while the shaft is rotating.

References Cited

UNITED STATES PATENTS

| | | | |
|---|---|---|---|
| 1,413,998 | 4/1922 | Templeton | 85—82 |
| 1,643,771 | 9/1927 | Dseman | 85—84 |
| 2,150,080 | 3/1939 | Rawlings. | |
| 2,246,888 | 6/1941 | Messenger | 85—84 |
| 2,640,618 | 6/1953 | Hale | 85—84 X |
| 2,668,468 | 2/1954 | Flogaus | 85—84 |
| 2,779,998 | 2/1957 | Bailey. | |
| 2,843,861 | 7/1958 | Gandy | 85—84 X |
| 3,130,629 | 4/1964 | Church | 85—82 |
| 3,198,058 | 8/1965 | Barry | 85—84 |

CHARLIE T. MOON, *Primary Examiner.*

U.S. Cl. X.R.

29—523, 526; 85—84